United States Patent
Blalock et al.

(10) Patent No.: US 8,779,693 B1
(45) Date of Patent: Jul. 15, 2014

(54) SYSTEMS, METHODS, AND DEVICES FOR PROVIDING THERMAL PROTECTION TO AN LED MODULE

(75) Inventors: Robert Allan Blalock, Peachtree City, GA (US); George Michael Drake, Newnan, GA (US)

(73) Assignee: Cooper Technologies Company, Houston, TX (US)

( * ) Notice: Subject to any disclaimer, the term of this patent is extended or adjusted under 35 U.S.C. 154(b) by 258 days.

(21) Appl. No.: 13/101,842

(22) Filed: May 5, 2011

Related U.S. Application Data

(60) Provisional application No. 61/331,601, filed on May 5, 2010.

(51) Int. Cl.
H05B 37/02 (2006.01)
H05B 41/285 (2006.01)

(52) U.S. Cl.
CPC ................................ *H05B 41/2856* (2013.01)
USPC ............................ 315/309; 315/291; 315/307

(58) Field of Classification Search
CPC ...................... G09G 2320/041; H05B 41/2856
USPC .......................................... 315/291, 307–309
See application file for complete search history.

(56) References Cited

U.S. PATENT DOCUMENTS

| | | | | |
|---|---|---|---|---|
| 4,437,743 A * | 3/1984 | Sakai et al. | | 396/96 |
| 6,161,910 A * | 12/2000 | Reisenauer et al. | | 315/309 |
| 6,964,501 B2 * | 11/2005 | Ryan | | 362/294 |
| 7,538,499 B2 * | 5/2009 | Ashdown | | 315/309 |
| 7,738,235 B2 * | 6/2010 | Gloisten et al. | | 361/173 |
| 7,888,875 B2 * | 2/2011 | Sibout | | 315/78 |
| 2006/0146553 A1 * | 7/2006 | Zeng et al. | | 362/488 |
| 2007/0062032 A1 * | 3/2007 | Ter-Hovhannissian | | 29/840 |
| 2008/0273331 A1 * | 11/2008 | Moss et al. | | 362/294 |
| 2010/0039049 A1 * | 2/2010 | Hoffman | | 315/309 |
| 2011/0243167 A1 * | 10/2011 | Castillo et al. | | 372/34 |

* cited by examiner

*Primary Examiner* — Jason M Crawford
(74) *Attorney, Agent, or Firm* — King & Spalding LLP

(57) ABSTRACT

A system for providing thermal protection for an LED light module and methods for manufacturing the same are described herein. The thermally protected LED light module may include a heat sink assembly thermally coupled to an LED light source, and a thermal protector. The thermal protector may be connected to the heat sink assembly by a mechanical fastener. Further, the thermal protector is electrically coupled to the LED light source and a power source where the thermal protector breaks the power provided to the LED light source from the power source when the thermal protector detects heat at or above a threshold temperature.

20 Claims, 5 Drawing Sheets

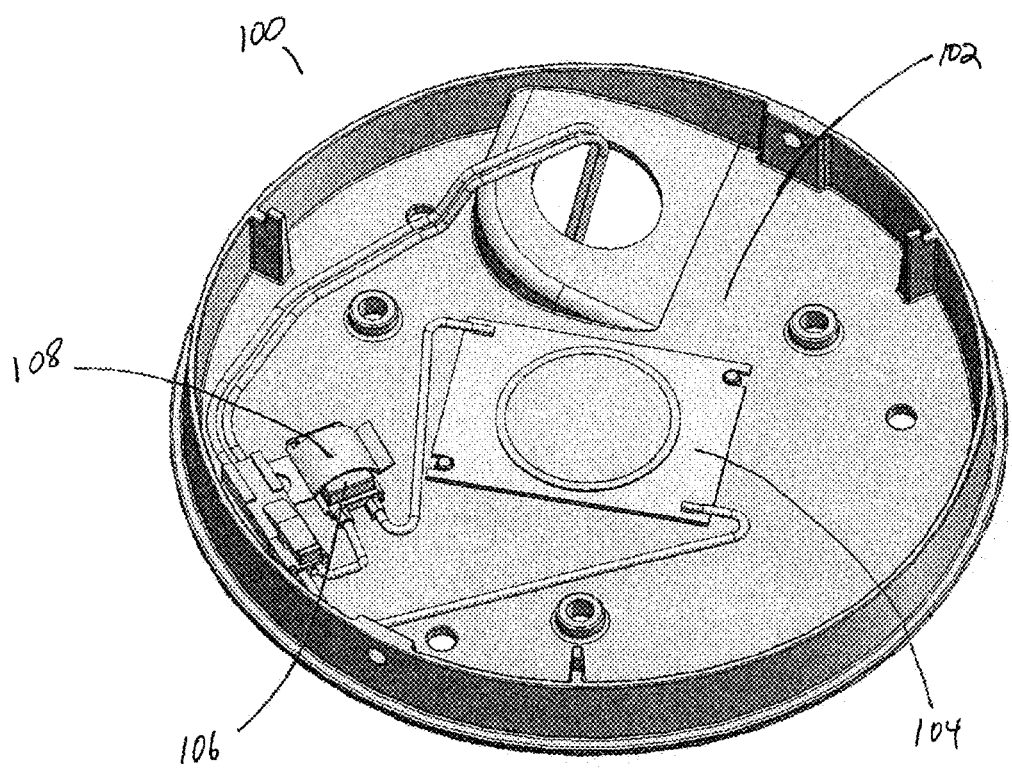
Figure 1: Secondary-side thermally protected LED circuit

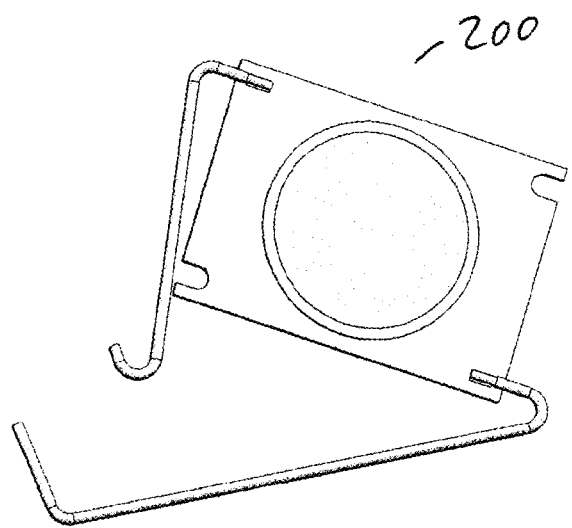
Figure 2: LED chip
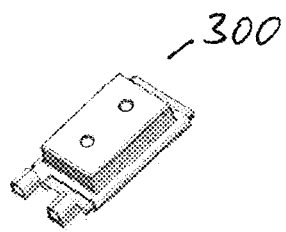
Figure 3: Example thermal protector
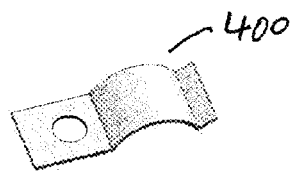
Figure 4: Thermal protector retainer clip

SYSTEMS, METHODS, AND DEVICES FOR PROVIDING THERMAL PROTECTION TO AN LED MODULE

RELATED APPLICATION

This application claims priority under 35 U.S.C. §119 to U.S. Provisional Patent Application No. 61/331,601, titled "System, Methods, and Devices for Providing Thermal Protection to an LED Module," filed on May 5, 2010, the entire contents of which are hereby fully incorporated herein by reference.

TECHNICAL FIELD

Embodiments of the invention relate generally to lighting solutions, and more particularly to systems, methods, and devices for providing flexible heat sinks to light modules.

BACKGROUND

Many light fixtures have incorporated LED light sources to produce light efficiently. In contrast to compact fluorescent light sources, where the ballast is the predominant heat generating source, the LED light sources generate heat that must be controlled. In conventional metal halide lamp applications, insulation detectors are mounted adjacent to the junction box in case of the misapplication of the luminaire. In the case of the insulation detector, a heater element is energized to achieve the break in circuit due to misapplication. The heater element requires power to be consumed. Thus, the heat element adds to the overall expense of the metal halide fixture and increases the consumption of power of that fixture. Currently, incandescent lamps in residential insulation contact (IC) construction have employed a thermal protector in the top center of the can housing. While LED light sources are more energy efficient than incandescent light sources and metal halide sources, thermal management remains an operation concern and safety concern in LED-based general lighting applications.

SUMMARY

According to an embodiment of the invention, there is disclosed an apparatus that includes a heat sink assembly thermally coupled to a light emitting diode (LED) light source, and a thermal protector, where the thermal protector is electrically coupled to the LED light source and a power source. The thermal protector breaks the power provided to the LED light source from the power source when the thermal protector detects heat at or above a threshold temperature.

In accordance with one aspect of the invention, the heat sink assembly is attached to a light fixture, wherein the heat sink assembly is positioned in the light fixture such that the LED light source emits light out of an aperture of the light fixture. In accordance with another embodiment of the invention, the thermal protector may be connected to the heat sink assembly by a mechanical fastener. According to another aspect of the invention, the mechanical fastener may be a retainer clip connected to the heat sink assembly only at one end of the retainer clip. In accordance with yet another embodiment of the invention, the thermal protector breaks the power provided to the LED light source from the power source when the thermal protector detects a temperature value above a threshold value.

According to another aspect of the invention, the threshold value associated with the thermal protector may be adjustable. In accordance with yet another embodiment of the invention, the thermal protector electrically coupled to the LED light source and the power source is in series with the power source and LED light source such that power from the power source to the LED source is routed through the thermal protector. According to another aspect of the invention, the thermal protector includes a sensor that detects a temperature and a switch, where the switch is closed when power is being provided from the power source to the LED light source, and the switch is opened when the sensor detects a temperature above a threshold value.

In accordance with yet another aspect of the invention, the power source may be remotely located from the heat sink assembly and the LED light source. According to another aspect of the invention, the heat sink assembly may be thermally coupled to the substrate of the LED light source. In accordance with yet another aspect of the invention, the substrate of the LED light source may be a circuit board. According to another aspect of the invention, the LED light source may include one or more LEDs. In accordance with yet another aspect of the invention, the heat sink assembly may be a plate. According to another aspect of the invention, the thermal protector may be located proximal to the LED light source.

In accordance with another embodiment of the invention, there is disclosed a method that includes providing a heat sink assembly thermally coupled to a light emitting diode (LED) light source and a thermal protector circuitry, where the thermal protector is electrically coupled to the LED light source and a power source, and powering the LED light source with the power source. The method further includes detecting a temperature value above a particular threshold value set by the thermal protector circuitry, and upon detecting a temperature value above a particular threshold value, automatically breaking the connection between the power source and the LED light source via the thermal protector circuitry.

BRIEF DESCRIPTION OF THE FIGURES

Having thus described the invention in general terms, reference will now be made to the accompanying drawings, which are not necessarily drawn to scale, and wherein:

FIG. 1 is a thermal protection circuit for an LED light module in accordance with an example embodiment of the invention.

FIG. 2 illustrates an example LED chip and leads in accordance with one embodiment of the invention.

FIG. 3 illustrates an example thermal protector in accordance with one embodiment of the invention.

FIG. 4 illustrates an example thermal protector retainer clip in accordance with one embodiment of the invention.

Figure 5:
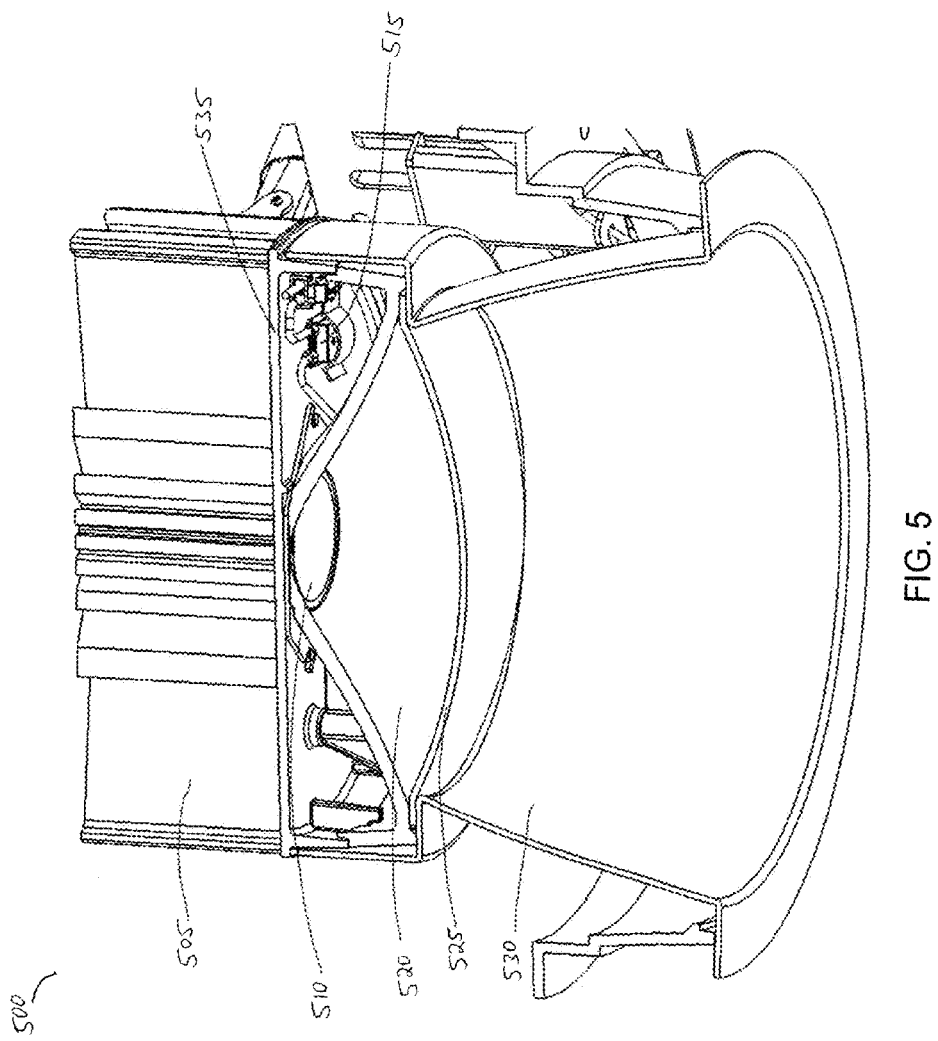

FIG. 5 illustrates a vertical cross section of an example light fixture utilizing the LED light module containing the thermal protection circuit in accordance with one embodiment of the invention.

Figure 6:
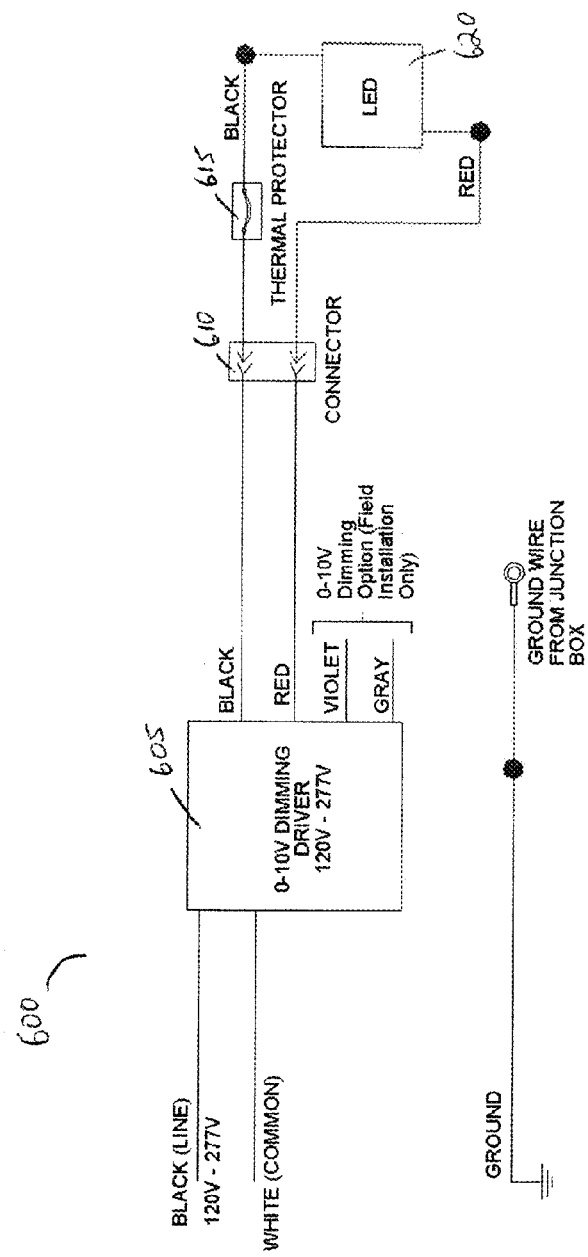

FIG. 6 illustrates a circuit diagram of the thermal protection of the LED light source in accordance with one embodiment of the invention.

Figure 7:
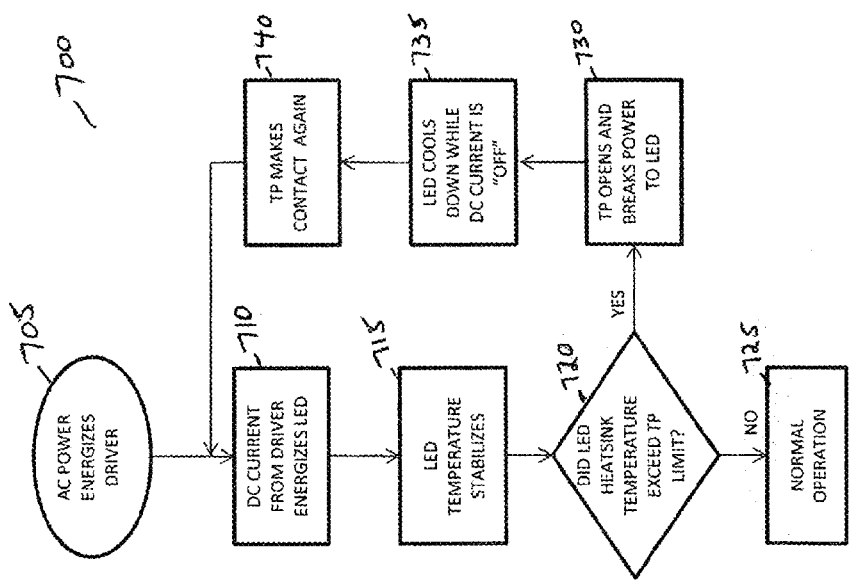

FIG. 7 illustrates a flow chart of the operation of the thermal protection circuit in accordance with one embodiment of the invention.

DETAILED DESCRIPTION OF EXEMPLARY EMBODIMENTS

Embodiments of the invention are directed to providing a thermal protector that is local to the LED module of a light fixture (e.g., the thermal protection is located between the LED driver and the LED light source also referred to as the is "secondary" side of the light module), such that the LED module is thermally protected regardless of the housing it is installed. Example embodiments of the invention are configured to break the DC power lead to the LED, but other embodiments could be applied to AC secondary situations as well. The systems and methods described herein may provide several advantages including preventing a fire hazard, alerting end users of misapplication of the LED luminaire, and reduces the wattage consumed by the luminaire as compared to alternatively using insulation detectors and/or other conventional thermal protection solutions for non-LED sources. With less watts consumed, the overall system efficiency is thereby increased (i.e., lumens per watt, LpW, is increase). LpW is a major factor in the qualification of luminaires for most lighting applications. Further, the solutions described herein allow for retrofitting existing luminaire housing, and/ or may be incorporated into new installations.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 is a thermal protection circuit 100 for an LED light module in accordance with an example embodiment of the invention. As shown in the example embodiment of FIG. 1, the heat sink assembly 102 absorbs the heat from the LED chip 104. The thermal protector 106 is connected to the heat sink assembly 102 by a mechanical fastener 108. Moreover, in the example embodiment of FIG. 1, the thermal protector 106 is located adjacent to the LED chip 104 where it will be most effective. Further, the thermal protector 106 is electrically connected to the LED chip 104 in the DC power supply path with one lead of the thermal protector 106 connected to the LED chip 104 and the other lead connected to the DC power supply (e.g., driver) such that when the operating temperature is below a particular threshold the thermal protector allows power to be transferred to the LED chip 104. However, when the operating temperature reaches (or exceeds) a particular threshold value, the thermal protector "breaks" the circuit supplying power to the LED chip 104, thereby shutting down the LED light source and stopping the increase generation of heat from the LED chip 104. Thus, the thermal protector prevents a potential fire hazard and provides notification to end users that the fixture is malfunctioning (i.e., too much heat is being generated by the LED chip 104).

In the example embodiment of the invention shown in FIG. 1, the thermal protector 106 is rated for certain designated temperatures (i.e., a temperature threshold value). Thus, upon temperatures reaching (or exceeding) the designated rating, the thermal protector 106 will open the circuit via a switch (e.g., a bi-metal switch, etc.), thereby breaking power to the LED 104 and thus breaking the heat generation cycle. Breaking power on the DC side avoids the requirement of separation of circuits required by Underwriter Laboratories (UL) for most thermal protection methods, which are often AC powered and voltage dependent.

FIG. 2 illustrates an example LED light source 200 such as an LED chip (or package, for instance a "chip on board" LED package) and electrical connector leads for providing electrical power to the LED light source 200 to illuminate the LED in accordance with one embodiment of the invention. FIG. 3 illustrates an example thermal protector 300 in accordance with one embodiment of the invention. FIG. 4 illustrates an example thermal protector retainer clip 400 in accordance with one embodiment of the invention. As shown in the example embodiment of FIG. 4, the thermal protector retainer clip is connected on one side to the plate. In an example embodiment of the invention, the plate may be part of the light module, heat sink, or both. Other means of connecting the retainer clip may be utilized in alternative embodiments of the invention such as screws on both sides of the retainer clip or another connection means.

FIG. 5 illustrates a vertical cross section of an example light fixture 500 utilizing the LED light module containing the thermal protection circuit in accordance with one embodiment of the invention. The light fixture 500 includes a heat sink 505 attached to the LED light source 510. As shown in the example embodiment of FIG. 5, the thermal protector 515 is placed proximal to the LED light source on the light module plate 535 that is connected to the heat sink 505. In alternative embodiments of the invention, the thermal protector 515 may be located directly on the heat sink 505, on the substrate of the LED light source 510, or on another portion of the light fixture the operating temperature of which is to be monitored. In the example light fixture 500 shown in FIG. 5, below the LED light source 500 is an upper reflector 520 and a lens 525 located just below the upper reflector. Also included in the example light fixture 500, is a lower reflector 530 located below the lens 525. Other configurations and embodiments of light fixtures employing the thermal protection methods and devices described herein are intended to be included within the scope of this application.

FIG. 6 illustrates a circuit diagram 600 of the thermal protection of the LED light source in accordance with one embodiment of the invention. As shown in the example embodiment of FIG. 6, a driver 605 receives AC power at its input and converts that input to a DC power source and provides power via a DC current (or DC voltage) to an LED light source 620, where the power supplied is routed through the thermal protector circuit. In the example embodiment shown in FIG. 6, the thermal protector acts as a switch that is triggered when the temperature sensor included with the thermal protector circuitry detects an operating temperature above or below a threshold temperature value established by the thermal protector setting or rating. In the example embodiment of FIG. 6, the driver output is connected to the light source through a connector 610 to complete the circuit from the driver 605 to the LED 620.

FIG. 7 illustrates a flow chart 700 of the operation of the thermal protection circuit in accordance with one embodiment of the invention. As shown in the example embodiment of FIG. 7, the thermal protection operation begins in block 705 where AC power is provided to the driver and driver converts that power to a DC power that is supplied to the LED light source via a DC current (or DC voltage) to energize the light source in block 710. As power is provided to the LED light source, the LED temperature will rise and eventually stabilize in block 715. Next, in block 720 the temperature of the LED heat sink connected to the LED light source substrate (or the LED heat sink or located in an area proximal to the LED light source) is monitored. In an example embodiment of the invention, the stabilizing temperature of the LED light source as indicated by the monitored temperature of the LED heat sink is less than the threshold temperature at which the thermal protector is set (or rated) to be triggered. In alternative embodiments of the invention, the thermal protector may be set to monitor the temperature of the LED substrate or another area of the light fixture as opposed to the heat sink. If the monitored heat sink temperature does not exceed the thermal protector set (or rated) threshold temperature, then the LED light source continues its normal operation in block 725. If the monitored heat sink temperature exceeds the thermal protector set (or rated) threshold temperature, then block 730 is invoked where the thermal protector breaks the power to the LED by preventing the DC current from being supplied to the LED.

Next, the LED cools down while the DC current is "off" in block 735. Once the LED temperature is below the threshold temperature, the thermal protector may reengage the DC current to the LED as in block 710. In some embodiment of the invention, the thermal protector may be configured to not reset for its normal operation until an external event occurs (e.g., a reset button, toggled switch, or another means).

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A light fixture comprising:
 a heat sink assembly comprising at least one internal surface facing an interior of the light fixture and at least one external surface facing away from the light fixture;
 a light emitting diode (LED) light source in thermal communication with the at least one internal surface of the heat sink assembly;
 a reflector disposed about the LED light source; and
 a thermal protector switch disposed between the reflector and the heat sink assembly, the thermal protector switch mounted directly on the at least one internal surface of the heat sink assembly by a mechanical fastener, wherein the thermal protector switch is electrically coupled to the LED light source and a power source, and wherein the thermal protector switch comprises a switch that opens and breaks the power provided to the LED light source from the power source when the thermal protector switch detects a temperature of the heat sink assembly that is at or above a threshold temperature associated with the thermal protector switch.

2. The light fixture of claim 1, wherein the heat sink assembly is positioned in the light fixture such that the LED light source emits light out of an aperture of the light fixture.

3. The light fixture of claim 1, wherein the mechanical fastener is a retainer clip connected to the heat sink assembly only at one end of the retainer clip.

4. The light fixture of claim 1, wherein the threshold temperature associated with the thermal protector switch is adjustable.

5. The light fixture of claim 1, wherein the thermal protector switch electrically coupled to the LED light source and the power source is in series with the power source and LED light source such that power from the power source to the LED source is routed through the thermal protector switch.

6. The light fixture of claim 1, wherein the thermal protector switch includes a sensor that detects the temperature, wherein the thermal protector switch is closed when the temperature the sensor detects is lower than the threshold temperature associated with the thermal protector switch.

7. The light fixture of claim 1, wherein the power source is remotely located from the heat sink assembly and the LED light source.

8. The light fixture of claim 1, wherein the heat sink assembly is in thermal communication with a substrate of the LED light source.

9. The light fixture of claim 8, wherein the substrate of the LED light source is a circuit board.

10. The light fixture of claim 1, wherein the LED light source comprises one or more LEDs.

11. The light fixture of claim 1, wherein the heat sink assembly is a plate.

12. The light fixture of claim 1, wherein the thermal protector switch is located proximal to the LED light source.

13. A method comprising:
 providing a heat sink assembly in thermal communication with a light emitting diode (LED) light source and a thermal protector circuitry mounted directly on the heat sink assembly by a mechanical fastener, wherein the thermal protector circuitry is electrically coupled to the LED light source and a power source and comprises a switch;
 powering the LED light source with the power source;
 detecting a first temperature value above a threshold value set by the thermal protector circuitry; and
 upon detecting the first temperature value above the threshold value, opening the switch to break the connection between the power source and the LED light source via the thermal protector circuitry.

14. The method of claim 13, wherein the threshold value is adjustable.

15. The method of claim 13, wherein the mechanical fastener is a retainer clip connected to the heat sink assembly only at one end of the retainer clip.

16. The method of claim 13, further comprising the step of closing the switch after a predetermined time period.

17. The method of claim 13, further comprising the step of closing the switch in connection with a manual reset of the thermal protector circuitry.

18. The method of claim 13, further comprising the step of closing the switch after detecting a second temperature value below the threshold value.

19. A light fixture comprising:
 a heat sink assembly in thermal communication with a light emitting diode (LED) light source; and
 a thermal protector switch mounted directly on the heat sink assembly with a mechanical fastener, wherein the thermal protector switch is electrically coupled to the LED light source and a power source, and wherein the thermal protector switch opens and breaks the power provided to the LED light source from the power source when the thermal protector switch detects a temperature of the heat sink assembly that is at or above a threshold temperature associated with the thermal protector switch.

20. The light fixture of claim 19 further comprising a reflector disposed about the LED light source such that the thermal protector switch is disposed between the heat sink assembly and the reflector.

* * * * *